INVENTORS
Theodore H. Krueger.
BY Angelo S. Gruttadauria
Moses Nolte & Nolte
ATTORNEY'S.

INVENTORS
Theodore H. Krueger.
BY Angelo S. Gruttadauria
Moses Nolte & Nolte.
ATTORNEY'S INVENTORS
Theodore H. Krueger.
BY Angelo S. Gruttadauria
Moses Nolte & Nolte.
ATTORNEY'S INVENTORS
Theodore H. Krueger.
BY Aneglo S. Gruttadauria.
Moses Nolte & Nolte.
ATTORNEY'S INVENTORS
Theodore H. Krueger.
BY Angelo S. Gruttadauria
Moses Nolte & Nolte
ATTORNEY'S

CYCLE-PHASE.A.

THE CYCLE STARTS WHEN ANY KEY IS DEPRESSED. FEED SOLENOID GETS CURRENT THROUGH KEY SWITCH: MOTOR GETS CURRENT THROUGH POLE "A" OF MOTOR SWITCH.

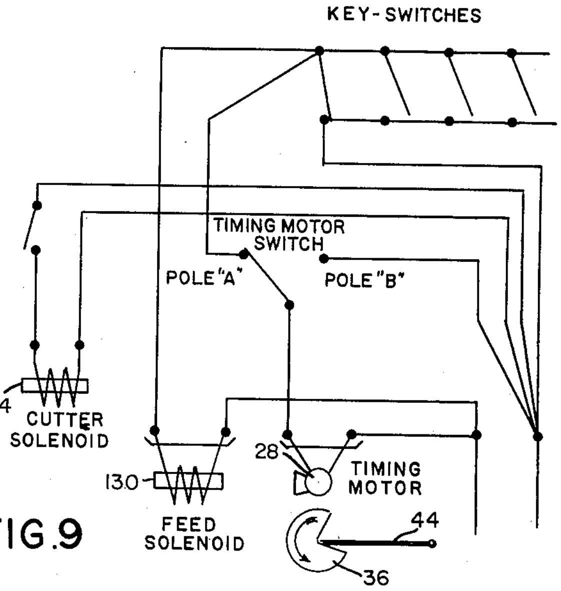

FIG.9

CYCLE-PHASE. B.

BEFORE SHORTEST LENGTH OF TAPE HAS BEEN FED, MOTOR SWITCH CAM HAS OPENED MOTOR CIRCUIT AT POLE "A" AND CLOSED MOTOR CIRCUIT THROUGH POLE "B" OF THE MOTOR SWITCH. SO THE TIMING MOTOR AND FEED SOLENOID GET CURRENT.

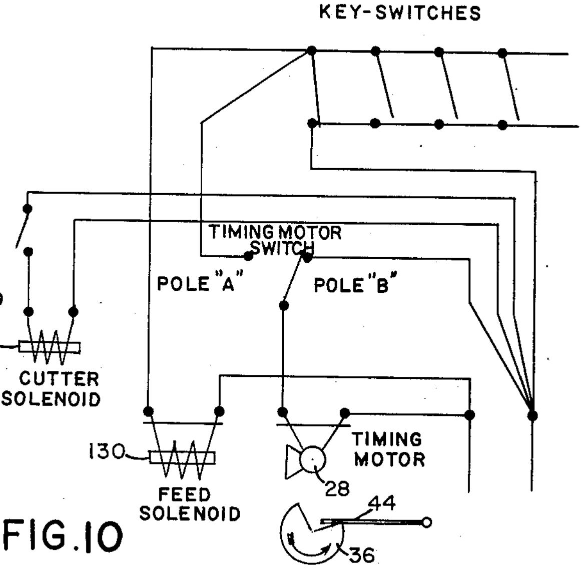

FIG.10

INVENTORS
Theodore H. Krueger
BY *Angelo S. Gruttadauria*
*Moses Nolte & Nolte.*
ATTORNEY'S INVENTORS
Theodore H. Krueger.
BY Angelo S. Grutladaurd
Moses Nolte & Nolte.
ATTORNEY'S 3,029,355

SELECTIVE TIMING DEVICE USEFUL FOR TAPE DISPENSING MACHINES AND OTHER PURPOSES

Theodore H. Krueger, Stratford, and Angelo Salvator Gruttadauria, Derby, Conn., assignors to Better Packages, Incorporated, a corporation of New York Filed Sept. 11, 1956, Ser. No. 609,155
5 Claims. (Cl. 307—141)

This invention relates to selective timing devices which enable an operator, by manipulation of a selective instrumentality, such as a key or push-button, to initiate an operation which will be automatically continued for a desired period of time and stopped, after which the device will reset itself ready for the next operation. A number of operating instrumentalities such as keys are provided each of which is associated with a definite time interval so that all that the operator has to do is to press the desired key and the intended function is performed for the selected time whereupon the apparatus resets itself to its initial position for further operations. The invention may be applied to any purpose where selected time operations are required. It finds particular utility, however, in connection with machines for dispensing various lengths of gummed tape and in the present case it will be described as applied to such a machine.

Gummed tape dispensing machines of the character under consideration include in general means for holding a roll of tape, means for feeding the tape and means for cutting off the tape. If the tape requires moistening, moistening means are provided. The tape feeding means may comprise a pair of rolls, one or both which are constantly driven from a motor, the rolls being normally spaced apart so as not to grip and feed the tape. When the tape is to be fed the rolls are brought into gripping relationship and held in that condition for a time sufficient to cause the proper length of tape to be fed. The rolls are then separated, feeding stops and the cut off means is actuated to cut off the fed lengths of tape. It is customary to use solenoids for drawing the rolls into feeding contact with the tape and for actuating the cutter.

The timing device of the present invention, in one of its preferred forms, comprises an intermittently rotatable shaft on which are a number of cams or actuating elements which are positioned angularly around the shaft at intervals so that when the shaft is rotated each cam or actuating device will come into action at a definite angular position which of course will correspond with a definite time interval after the shaft begins to rotate from a starting position. A series of manual actuating devices, such as keys, are provided, one located in association with each cam. These keys are normally inactive but all are so arranged as to start the shaft rotating means, such as a timing motor, so that upon depression of any key the rotation of the shaft will be started from a zero position. The depression of the key also starts the operation which is to be timed. In the case of a tape feeding machine depression of a key closes the circuit through the feed solenoid, drawing the feed rollers together and initiating the feed of a piece of tape. The termination of the feed depends upon the time when the cam associated with the particular key depressed, acts upon that key to restore it to its initial position, breaks the solenoid circuit and stops the tape feed.

A characteristic of the present invention resides in the fact that it is not sufficient to simply stop the particular operation, such as tape feeding, at a particular instant, but the timing mechanism must continue through a full cycle in order to return to the zero position for a subsequent operation. In the present instance this is accomplished by having a timing motor switch cam on the rotatable shaft or arranged to rotate coordinately therewith which will stop the rotation of the shaft only at the end of the cycle, usually one complete revolution of the shaft. Means are also provided so that while depressing of a key will initiate the rotation of the shaft, restoring of the key by its cam will not stop the rotation of the shaft which will continue until the cycle is completed as determined by the timing motor switch cam. Where a second operation, such as cutting of the tape has to be performed during the cycle, this is controlled by the rotation of the shaft and is timed to take place after the cam corresponding with the longest piece of tape to be fed has passed its key restoring position and before the timing motor switch has been actuated by its cam so as to end the cycle.

In the present application the invention has been shown as applied to a tape dispensing unit of the form shown in Le Baron and Dodds U.S. patent application 497,884, filed March 30, 1955, it being substituted for the electronic timing measuring mechanism shown in said application. As hereinbefore stated the timing measuring mechanism of the present invention may be applied to other uses.

In the accompanying drawings

FIGURES 9, 10, 11 and 12 are partial wiring diagrams showing successive phases in a single timing cycle; and FIGURE 13 is a diagrammatic view illustrating a modification.

Figure 1:
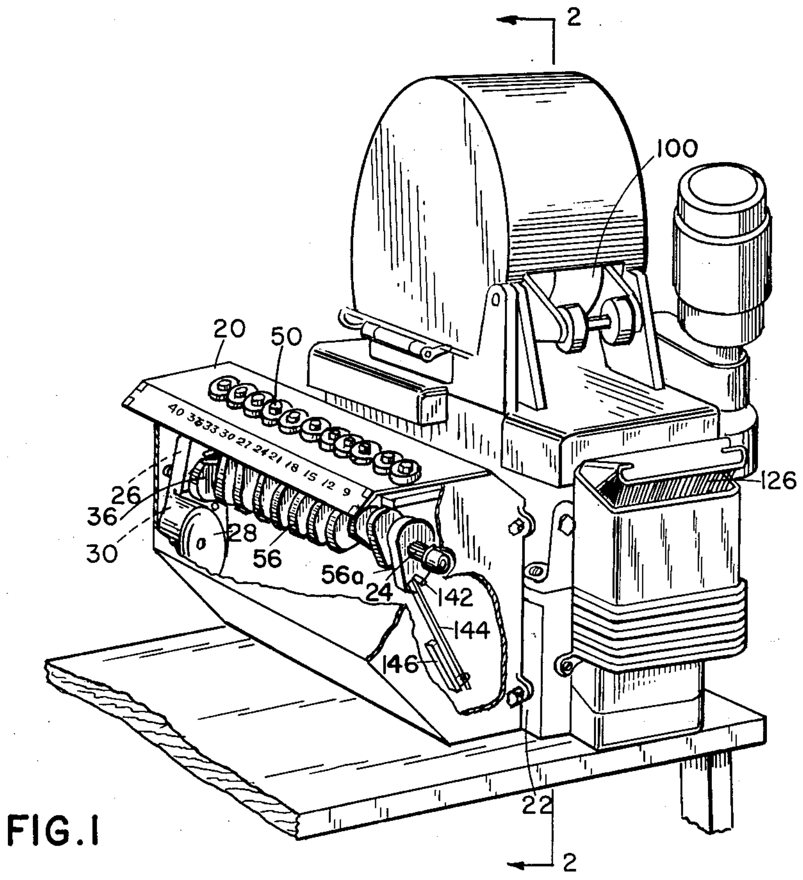
FIGURE 1 is a perspective view of a tape dispenser having the timing device applied thereto, part of the casing of the timing device being broken away.
Figure 2:
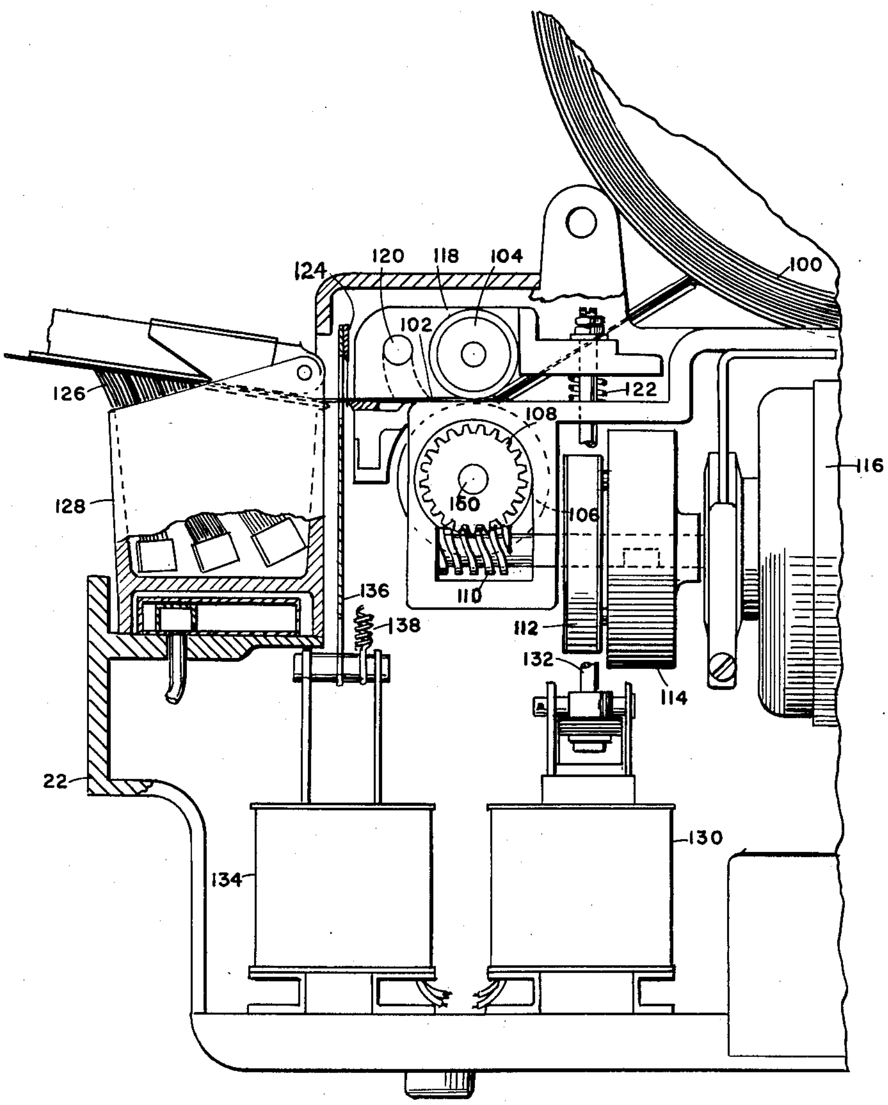
FIGURE 2 is a vertical sectional view of the dispenser taken on line 2—2 of FIGURE 1, parts being broken away.

Referring to the drawings in detail the timing device illustrated is mounted in a casing 20 which is shown as attached to the side of the casing 22 of a tape dispensing machine. Mounted in the casing 20 is the main shaft 24 of the timer which is driven through suitable gearing 26 from a motor 28 having a reduction drive 30, preferably incorporated with or directly attached to the motor. The motor should be of a type which will stop instantly when deenergized. Such a motor may be of the permanent magnetic field type such, for example, as the Cramer motor which is a synchronous motor having a permanent magnetic field. When the current is turned off the field acts as a brake and thus stops the motor instantly. Other types of motor may be used if provided with means for stopping the motor instantly such as a magnetic or mechanical brake or a source of direct current which may be impressed on the motor when the regular operating alternating current is cut off.

Figure 6:
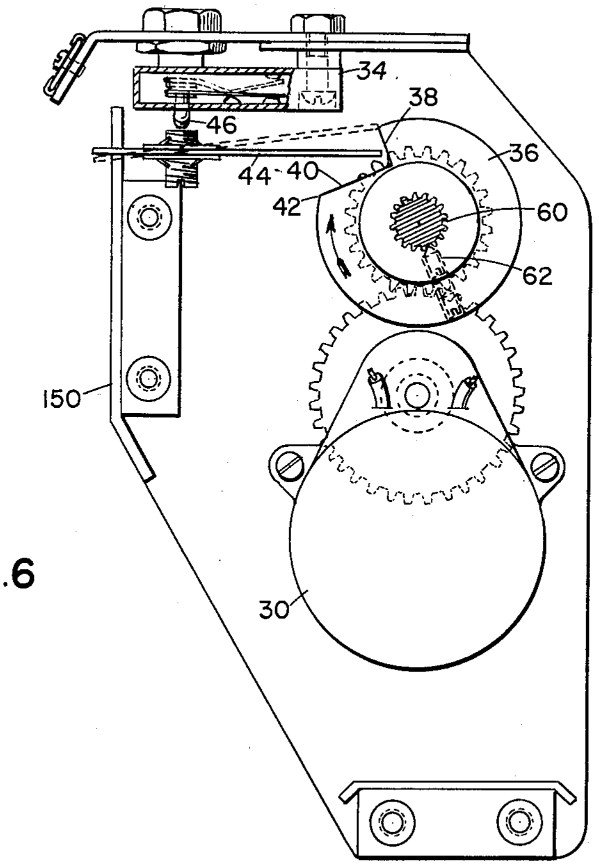
FIGURE 6 is a vertical sectional view on line 6—6 of FIGURE 4.

In the timing motor circuit 32 (FIGURE 8) is a three pole timing motor switch 34 the movable blade of which is movable between pole position A and pole position B by means of a timing motor cam 36 which is mounted on the main timing cam shaft 24. The timing motor cam 36 (FIGURE 6) has a notch cut in it bounded by a radial wall or shoulder 38 and a wall 40 which is shown at an angle of approximately 90° to the wall 38 and which meets the circumference of the cam at a point 42.

Co-operating with the cam is a clapper 44 which is operatively connected with the timing switch 34 in any suitable manner as by a push pin 46.

Figures 3, 4, 5:
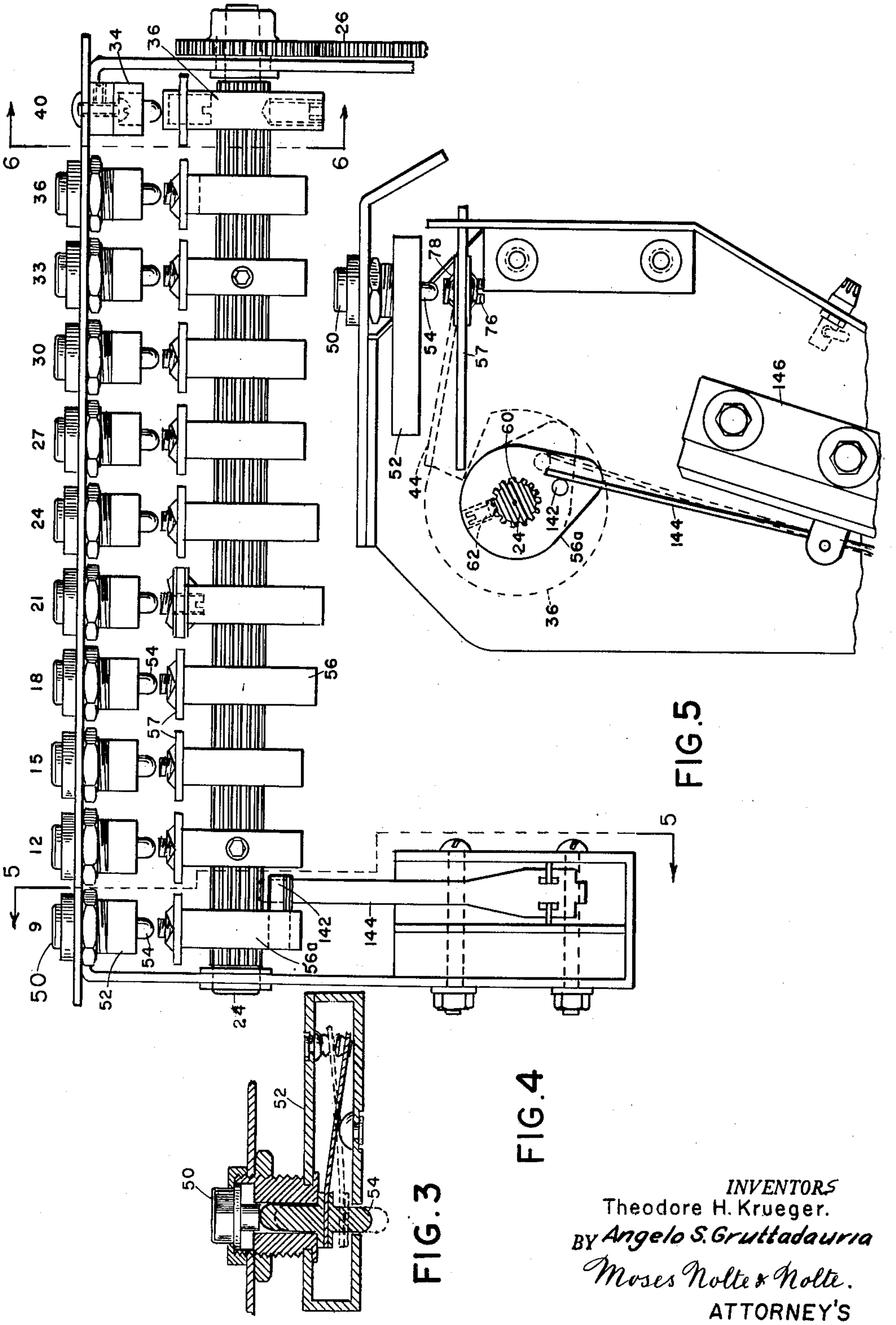
FIGURE 3 is a vertical sectional view of one of the keys or push buttons and associated switch.
FIGURE 4 is a vertical longitudinal sectional view of parts of the timing mechanism looking at the same from back as indicated by line 4—4 of FIGURE 5.
FIGURE 5 is a partial vertical sectional view on line 5—5 of FIGURE 4.

A number of control elements are provided such as the push buttons or keys 50 which are shown as mounted in a row on top of the casing 20. Each of these keys actuates a switch 52 which is preferably of the reset type. As shown in FIGURE 3, each switch carries an actuating pin 54 which is pushed down when the key is pressed and which projects below the switch and will stay in either reset or depressed position to which it may be moved. When the key and pin are depressed the contacts of the switch 52 are closed and when the pin and key are pushed up the switch is opened. A series of cams 56 are provided on the shaft 24, each cam being engaged by a cam follower or clapper 57, there being one cam and clapper under each key and switch. When the key is not depressed the end of the pin 54 will not be contacted by the clapper when the cam rotates but if the key is pushed down the end of the pin 54 projects in the path of the clapper so that when the high part of the cam comes around in the course of the rotation of the shaft 24, the pin 54 above that cam and clapper will be pushed up thereby resetting the switch and key associated with that cam. The cams are mounted on the shaft 24 at various angles so that the depressed key will be reset at the proper time in the cycle depending upon the angle at which its cam is set. The cams are conveniently made adjustable although this is not essential. In the construction shown the shaft 24 is provided with longitudinally extending teeth 60 and each cam is provided with a set screw 62, the point of which may be screwed in between two teeth so as to lock the cam inmovably in the desired adjusted position.

Figure 7:
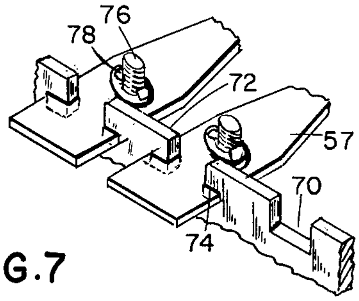
FIGURE 7 is a fragmentary perspective view showing the manner of mounting the switch operating clappers.

The various switch operating clappers such as 44 and 57 may be of any suitable construction. A convenient way of mounting these clappers is that shown in FIGURE 7 in which the wall of the casing 20 is formed with vertical slots 70 so as to provide spaced wall portions 72 at the top edge thereof. The clappers are made of flat plates, in the opposite edges of which are notches 74. These receive the edges of the wall portions 72 which retain the clappers in position but permit limited upward and downward pivotal movement thereof. The clappers preferably carry adjusting screw 76 which contact the switch pins 54. Speed nut members of spring steel having tongues 78 are screwed tightly on the adjusting screws on each side of the clappers so as to be under constant tension and place the screw under tension in both directions. The operator can make a very fine adjustment of the screw and be assured that the screw will hold whatever adjustment is given to it.

Figure 8:
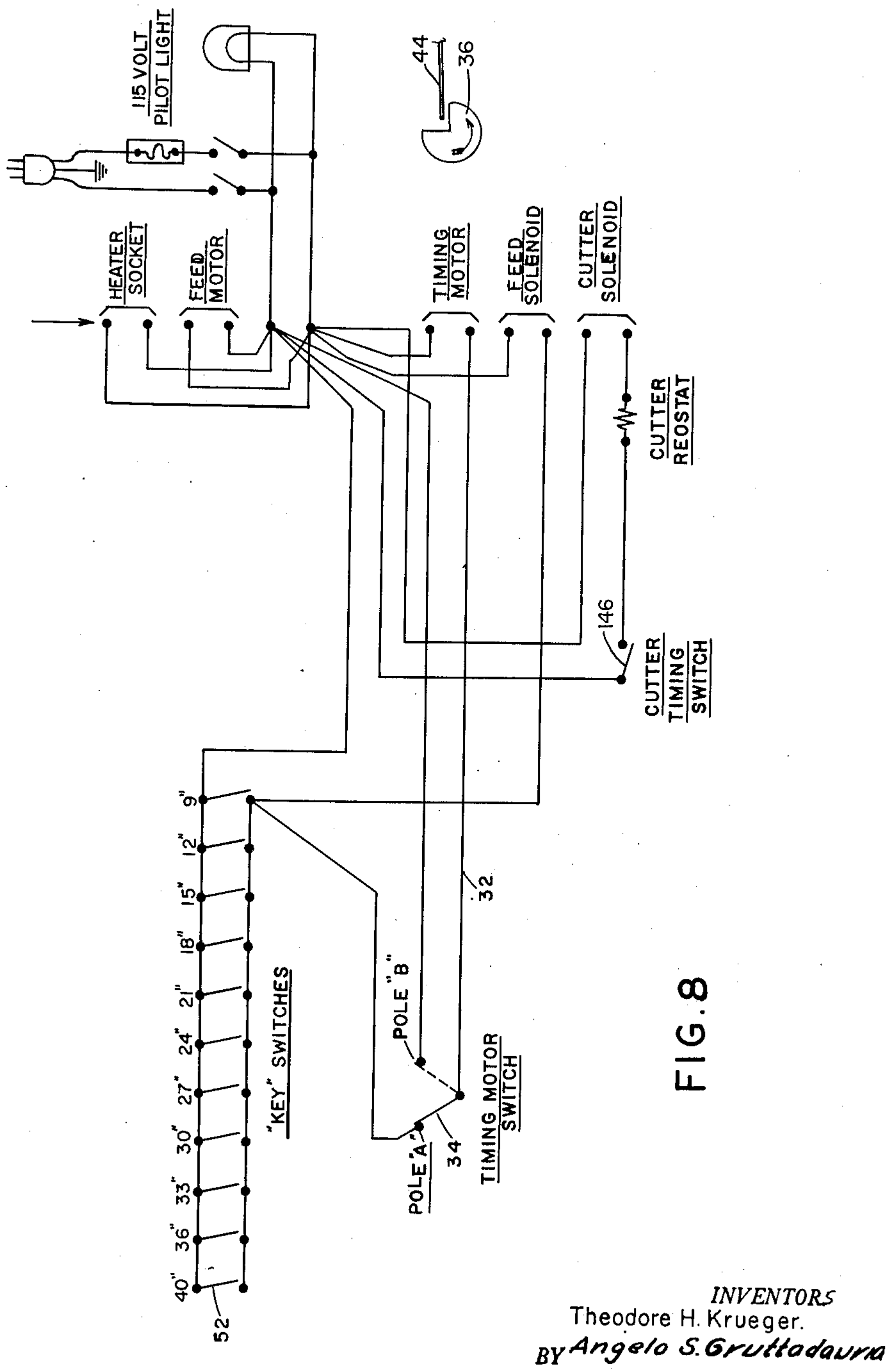
FIGURE 8 is a schematic wiring diagram of the tape dispenser equipped with the selective timer.
Figure 11:
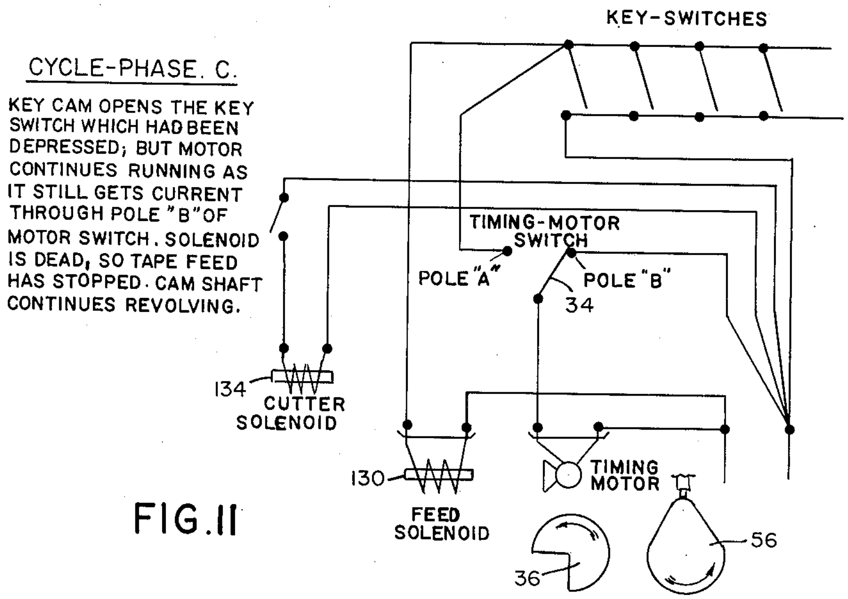

Referring again to the wiring diagram, FIGURE 8, it will be seen that each of the key switches 52 is located in the branch of the timing motor circuit connected with pole A of the timing motor switch. Assuming the contact at pole A is closed, depression of a key so as to close a switch 52 will close the circuit of the timing motor and start the rotation of the shaft 24 and cams mounted thereon. The first thing that happens when the timing motor starts is to rotate the timing motor cam 36 until the point 42 contacts and raises clapper 44 of the timing motor switch so as to move the latter from pole A to pole B. This change takes place instantaneously so that the timing motor continues operating on the circuit passing through pole B and will keep on so operating until a complete revolution of the cam 36 takes place at which time the clapper 44 will drop off the shoulder 38 and instantly stop the timing motor as described above. If desired, a timing motor switch may be used in which contact is made with pole B before the circuit which has been closed through pole A is actually broken thereby insuring continued operation of the motor. Use of such a switch is usually found unnecessary, however. Before the timing motor is stopped by rotation of the timing motor cam 36 it will be understood that whichever switch 52 has been closed by its key or push button will have been reset by the engagement of its appropriate cam clapper with the pin 54. Therefore, when the timing motor switch clapper drops off the shoulder 38 on the timing motor cam, the circuit though restored through pole A is broken at the key switches 52 and will remain broken until another key 50 is depressed.

The instrumentality, the operation of which is to be timed to occur at a definite moment, is connected in series with the bank of key switches 52 which are connected in parallel so that the operation time will be determined by the particular key which is depressed. In the example shown the tape is fed by mechanism controlled by a feed solenoid which operates to start the feed when a key switch 52 is closed and stops the feed when the switch 52 is opened. Thus the duration of the feed is determined by the angular setting of the cam corresponding with the particular key switch which has been closed. After the key switch has been reset by its cam, thereby stopping the feed, the timing motor will nevertheless continue to operate through the circuit including pole B of the timing motor switch until the timing motor cam has completed its cycle (1 revolution).

In the illustrative embodiment of the invention applied to a tape dispensing machine the tape dispensing machine may be of the general construction shown in said patent application, Serial No. 497,884. Briefly, such a machine comprises a casing 22 which has mounted on the top a receptacle carrying a roll of tape 100 from which the strip of tape 102 passes between feed rollers 104 and 106. The rollers are driven by means of worm gear 108 fixed to the shaft of roller 106 and meshing with a worm 110 affixed to the shaft of a member 112 which is connected to clutch and fly wheel member 114 mounted on a shaft of a tape feed motor 116. The feed roller 104 is mounted in a cradle 118 pivoted on a shaft 120, the cradle being normally swung upwardly by spring 122 so as to hold the roller 104 out of contact with the roller 106. When this condition obtains the tape is not being fed although the motor 116 may continue to operate. When the cradle is drawn down so as to cause the roller 104 to grip the tape tightly between the rollers 104 and 106 then the tape will be fed. The tape is fed past a cutter having a movable blade 124 and then if of the type requiring moistening, the tape is passed over moistening brushes 126 mounted in a water tank 128. For drawing down the cradle 118 so as to start the feed a feed solenoid 130 is provided which is connected to the cradle through a pull rod 132. For actuating the cutter a cutter solenoid 134 is provided which is connected to a cutter plate 136 on which the cutter 124 is mounted. When the solenoid 134 is deenergized the cutter is raised by a tension spring 138.

The operation of the feed solenoid has already been described. It is energized whenever one of the key switches is closed, the timing motor being simultaneously started. As soon as the cam associated with the key switch reaches a position to open the key switch the feed solenoid is deenergized and feed stops. Assuming the feed rollers to be driven at constant speed by the motor 116 it will be seen that the length of tape fed will be a function of the time and therefore each key may be associated with a particular length of tape to be fed which may be indicated by a scale mounted alongside the key switches as shown in FIGURE 1. The scale can be calibrated directly in length units such as inches.

For determining the time of cutting which may be the same for any length of strip so long as it takes place after the feed has stopped and before the end of the cycle, a cutter cam 56a is provided which carries a pin 142 engaging the operating arm 144 of the cutter timing switch 146. When the pin 142 contacts the arm 144 which will occur before the shoulder 38 passes the end of the clapper 44, the cutter solenoid will be actuated to operate the cutter. The cutting preferably takes place as soon as possible after the feeding time required to feed the longest strip of tape. If desired the cam **56*a* carrying the pin 142 may also operate one of the key switches, preferably one timing a short length of tape. This permits the cam to perform its switch opening function well before the pin 142** operates the cutter switch.

Figures 12, 13:
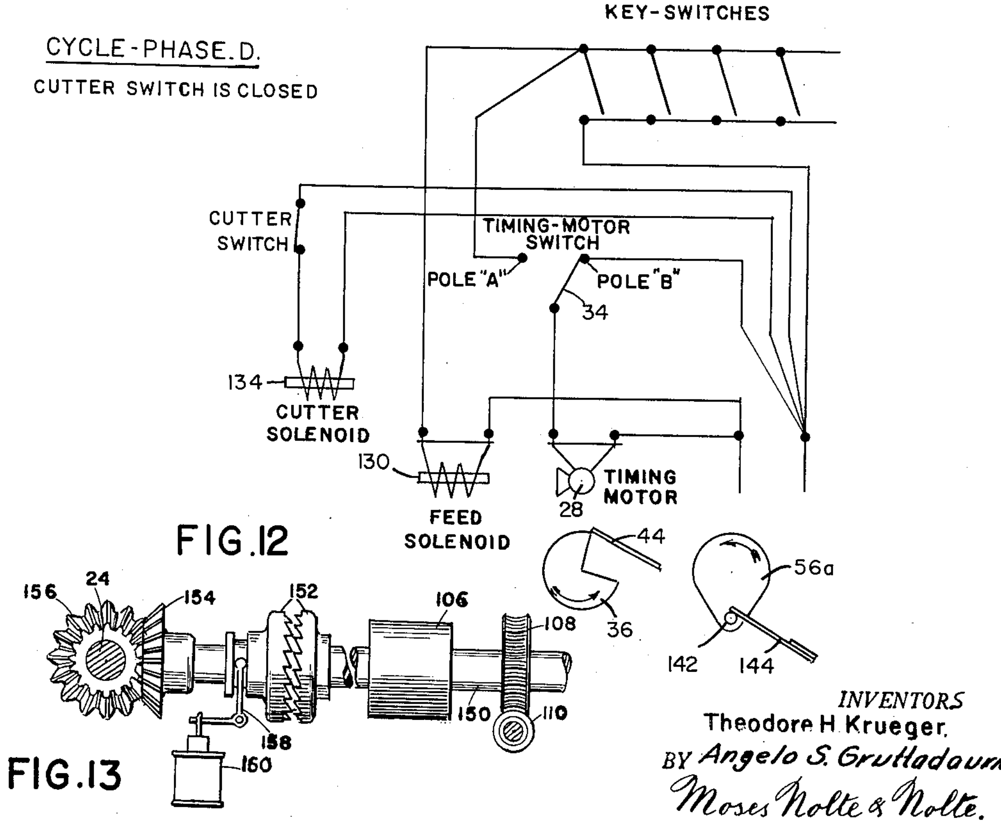

FIGURE 13 illustrates a modification of the invention in which a separate timing motor is dispensed with. The timing device is driven from some operative part of the machine on which the timing device is used, being connected to the source of power in any suitable manner as by means of an electrically controlled clutch. In FIGURE 13 the power for rotating the cam shaft 24 is taken from the shaft 150 on which the feed roll 106 is mounted. This shaft is driven by the worm 110 on the shaft of motor 116 which is constantly operating during normal use of the dispensing machine. Power is transmitted through the clutch 152 to the bevel gear 154 meshing with the bevel gear 156 on the shaft 24. The clutch 152 is shifted by bell crank 158 and solenoid 160. The solenoid 160 is connected into the wiring system in place of the timing motor so that instead of the timing motor being started and stopped by the operation of the switch described the clutch will be thrown in or out.

We have described what we believe to be the best embodiments of our invention. We do not wish, however, to be confined to the embodiments shown, but what we desire to cover by Letters Patent is set forth in the appended claims.

We claim:

1. Selective cycle controlling means for determining the duration of an action to be performed comprising a plurality of manually operable elements, first action initiating means, an operative connection from each of said elements to said first action initiating means, a control device movable through a definite uniform cycle each time it is started, an operative connection from each of said manually operable elements to said control device constructed and arranged to start the said device on a cycle when the action to be controlled is initiated, means associated with each manually operable element and actuated by the control device to stop the action at a definite point before the end of the cycle of the control device, specific to the particular element selected for operation, means operatively connected with the control device and actuated thereby after completion of a controlled action and before the end of the control device cycle for causing performance of a second and different action, and means operable automatically at the end of the control device cycle to stop the control device and set the same in condition to be restarted by manipulation of one of the manually operable elements.

2. Selective cycle controlling means for determining the duration of an action to be performed, comprising a plurality of manually operable switches connected in parallel, electrically controlled action initiating means, circuitry connecting said switches and action initiating means, a mechanical control device, means for driving the same, an electric control for said driving means, means for establishing a first circuit through the switches and said electric control so as to start driving of the control device upon actuation of one of said switches, means actuated by the control device for establishing a second circuit through said electric control by-passing said manually operated switches so that said control device will be driven after the manually operated switch has been opened, said control device including mechanical means for opening the previously manually operated switch so as to stop the performance of the action, said control device also including mechanical means for re-establishing said first circuit and breaking said second circuit, thereby stopping the control device and setting the system in condition for the control device to be started upon the closing of one of the manual switches.

3. Selective cycle controlling means for determining the duration of an action to be performed, comprising a plurality of manual switches connected in parallel, electrically controlled action initiating means, circuitry connecting said switches and action initiating means, a mechanical control device, means for driving the same, an electric control for said driving means, a three pole switch which in one position establishes a first circuit through the switches and said electric control so as to start driving of the control device upon actuation of one of said manual switches, means actuated by the control device for moving said three pole switch so as to establish a second circuit through said electric control by-passing said manual switches so that said control device will be driven after the manual switch has been opened, said control device including mechanical means for opening the previously manually operated switch so as to stop the performance of the action, said control device also including mechanical means for restoring said three-pole switch to its initial position thereby stopping the control device and setting the system in condition for the control device to be started upon the closing of one of the manual switches.

4. A system as claimed in claim 3 in which the control device includes a plurality of cams, each of which is arranged to reset a corresponding manual switch, and a control drive cam for actuating the three-pole switch.

5. Selective cycle controlling means for determining the duration of a first operation, said control means comprising a shaft, means for rotating the same through cycles, each comprising a single revolution of the shaft, a control cam mounted on the shaft, a control switch controlled by said control cam, a cam for performing a second operation mounted on the shaft, a switch actuated by said last-named cam once during each cycle for controlling said second operation, a series of measuring cams for controlling the duration of the first operation mounted on the shaft and spaced about the shaft at angular intervals, resettable key switches, one associated with each measuring cam, keys for manually setting the key switches, the cams being constructed and arranged to reset the key switches at definite intervals depending upon the angular positions of the cams, circuitry connecting the control switch, key switches, control shaft driving means and instrumentalities for performing said first operation constructed and arranged to cause said instrumentalities to start said first operation and the control shaft to start a revolution on actuation of any one of the resettable switches by its key, the cam appropriate to that key acting to reset said switch and stop the operation of said instrumentalities after an interval determined by the position of such cam, the control switch controlling the circuitry to the control shaft driving means so as to cause said shaft to complete one revolution, cause performance of said second operation, stop and reset the circuitry so that a new control cycle may be started by actuating any one of the switch keys.

References Cited in the file of this patent

UNITED STATES PATENTS

| | | |
|---|---|---|
| 805,724 | Harter | Nov. 28, 1905 |
| 1,197,788 | Bircher | Sept. 12, 1916 |
| 1,370,747 | Ide | Mar. 8, 1921 |
| 1,672,701 | Vauclain et al. | June 5, 1928 |
| 1,820,252 | Shippey | Aug. 25, 1931 |
| 1,828,126 | Brown | Oct. 20, 1931 |
| 1,961,871 | Caskey | June 5, 1934 |
| 2,306,056 | Harvey | Dec. 22, 1942 |
| 2,408,363 | Beckman | Oct. 1, 1946 |
| 2,727,570 | Hempel | Dec. 20, 1955 |
| 2,776,009 | Tamburr | Jan. 1, 1957 |